INVENTOR
ALBERTO ALVAREZ-CALDERON

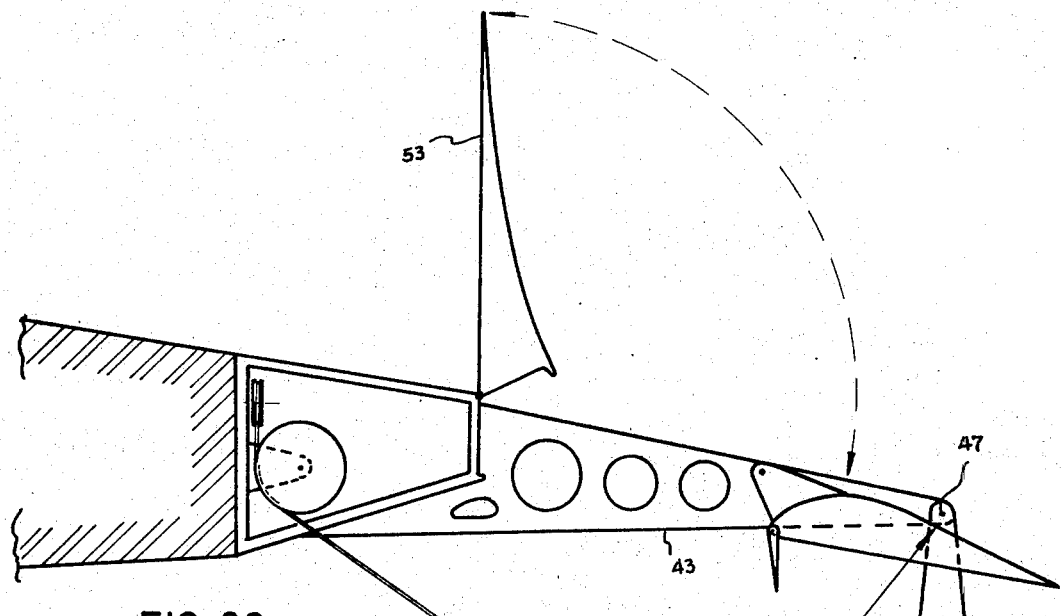
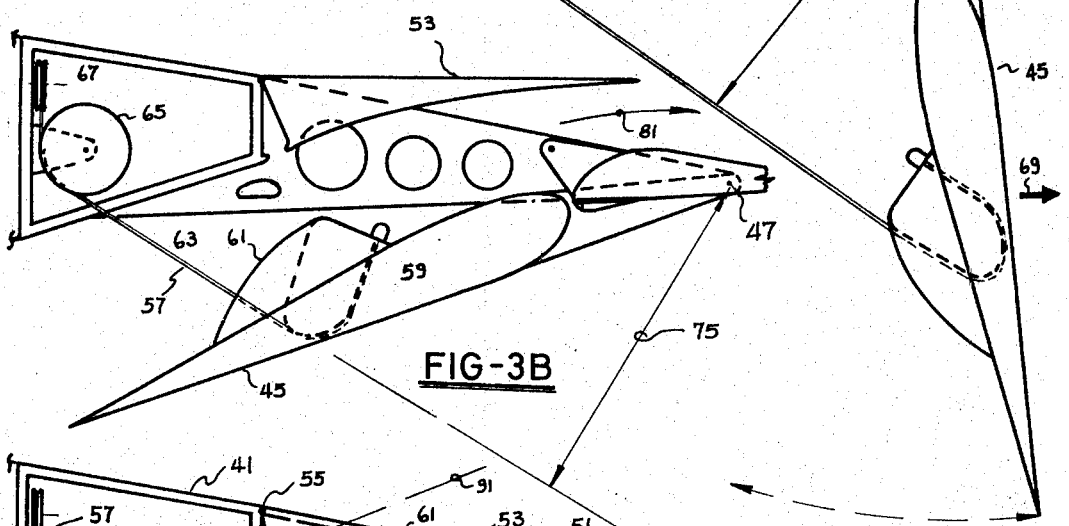
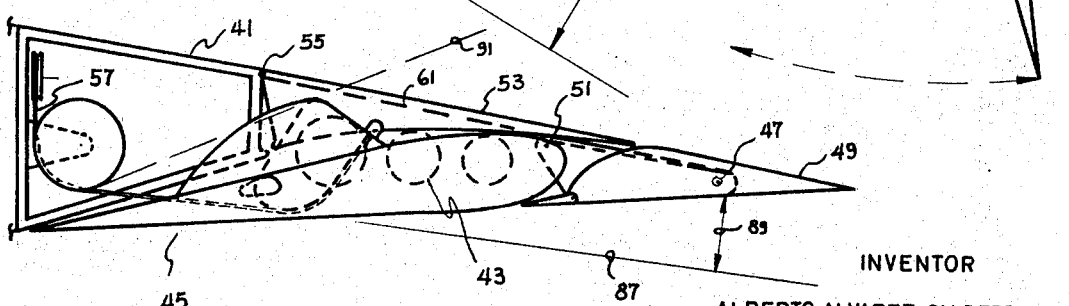

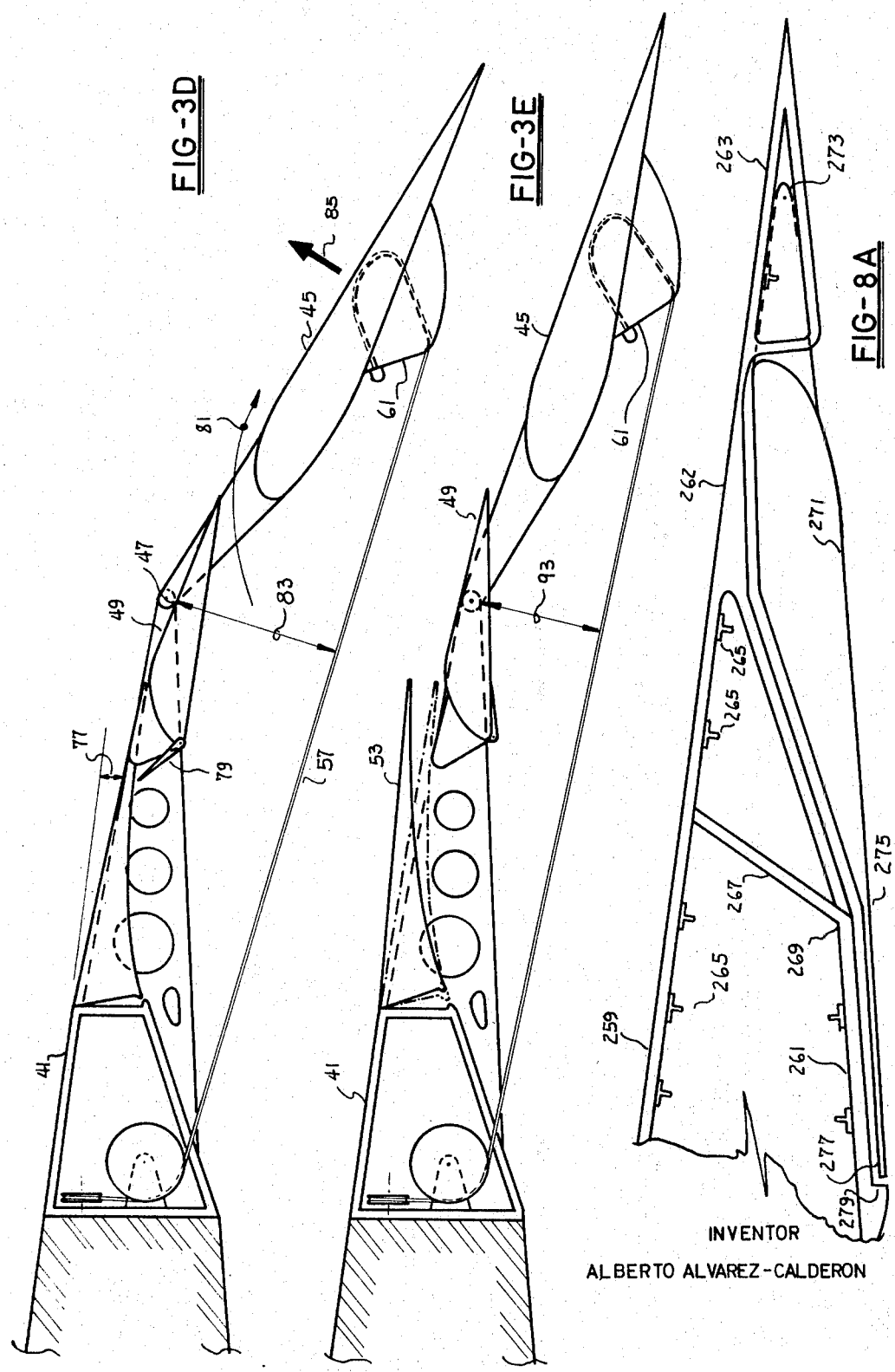

INVENTOR
ALBERTO ALVAREZ-CALDERON

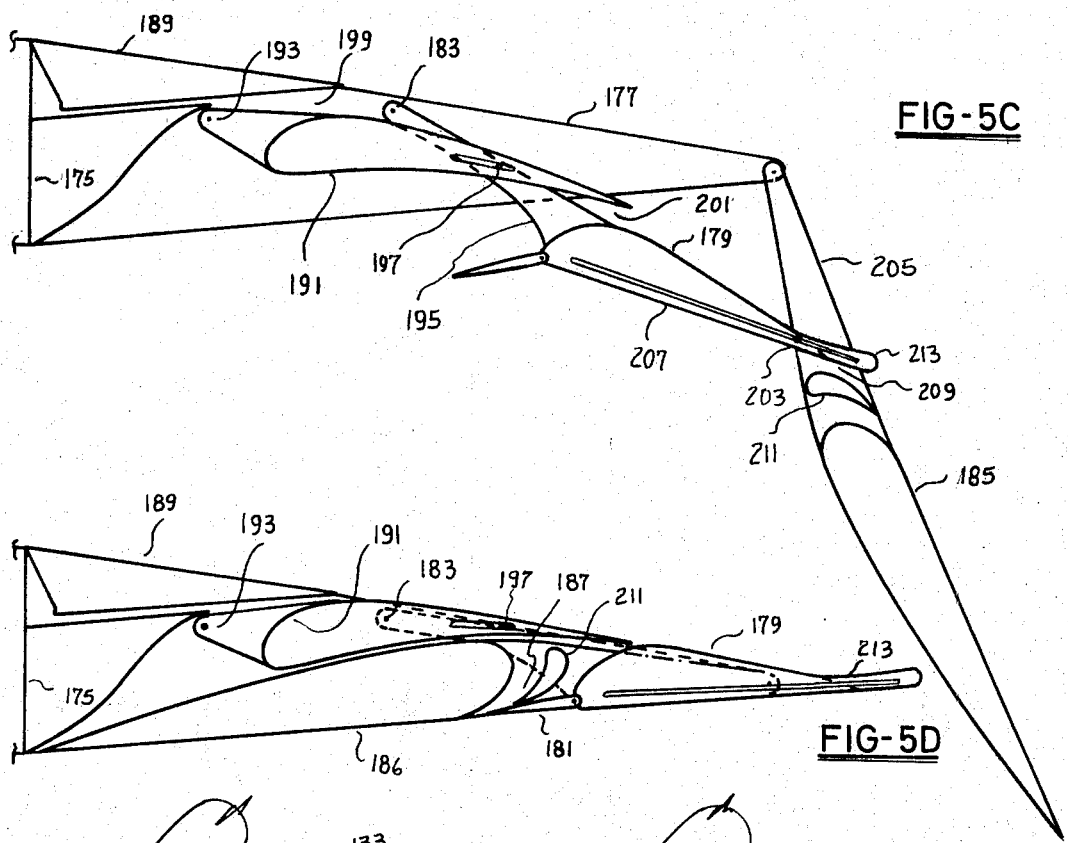
FIG-5C
FIG-5D
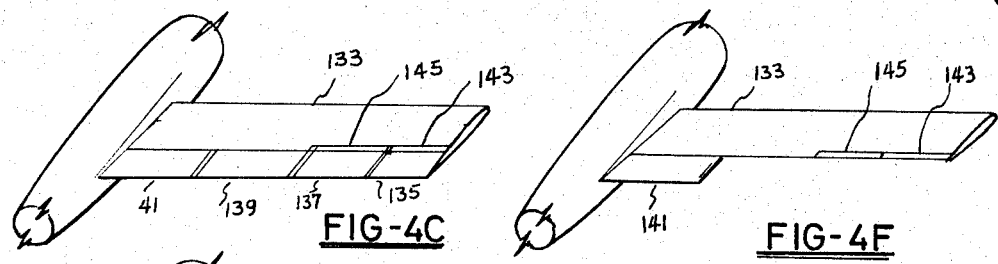
FIG-4C
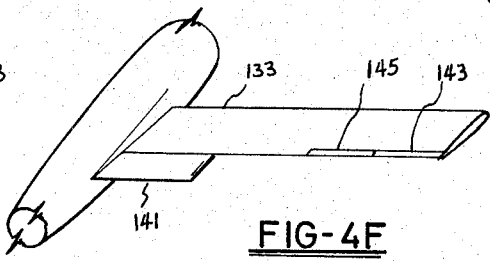
FIG-4F
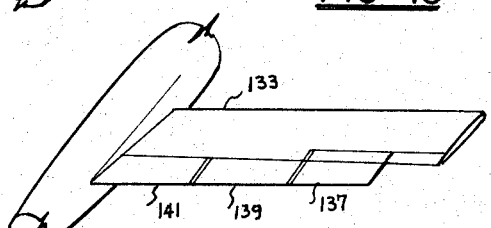
FIG-4D
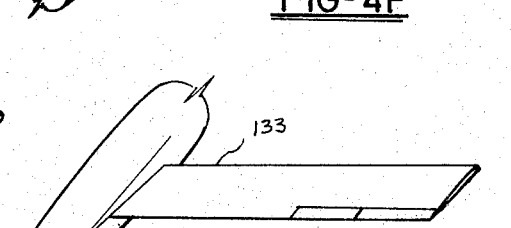
FIG-4G
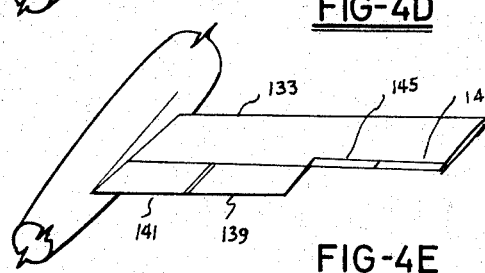
FIG-4E

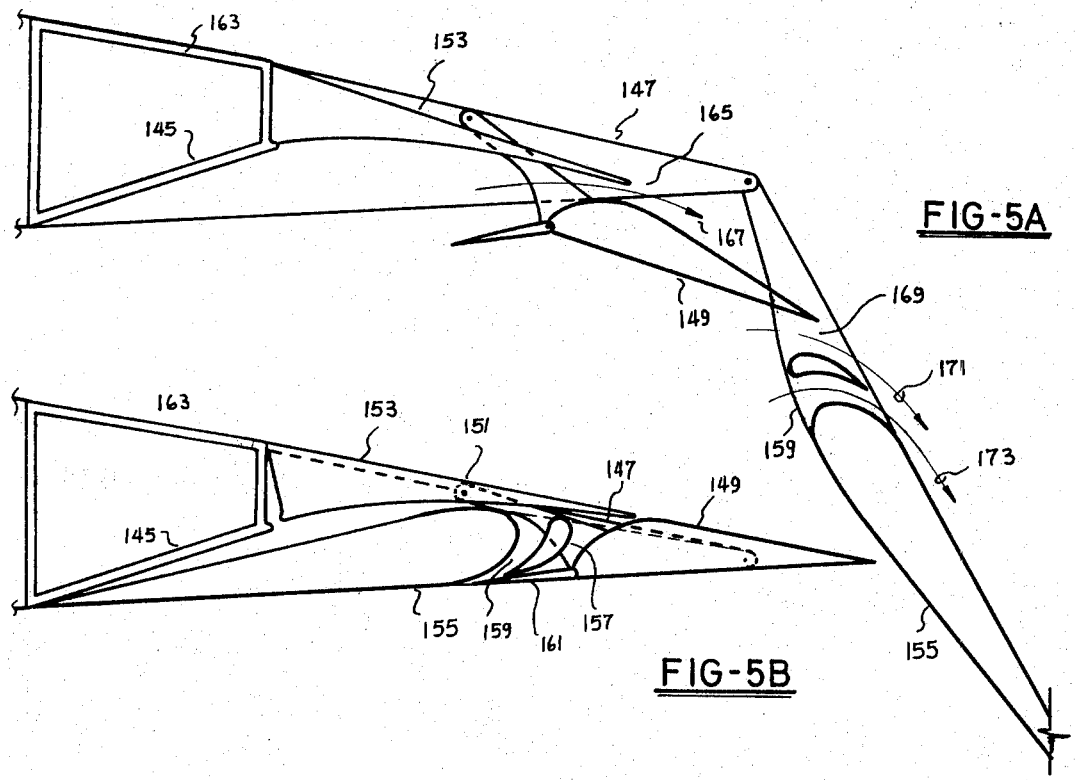

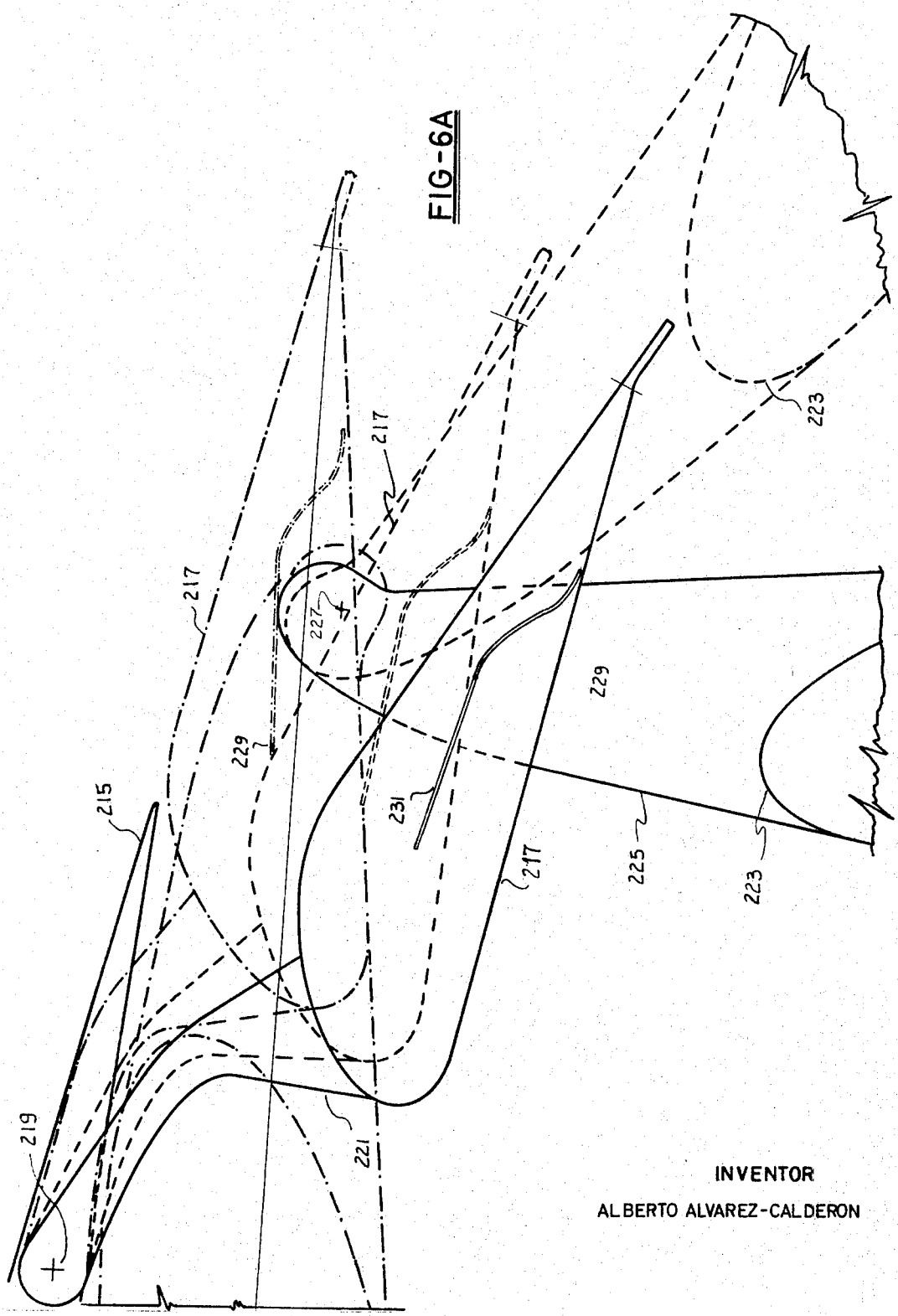

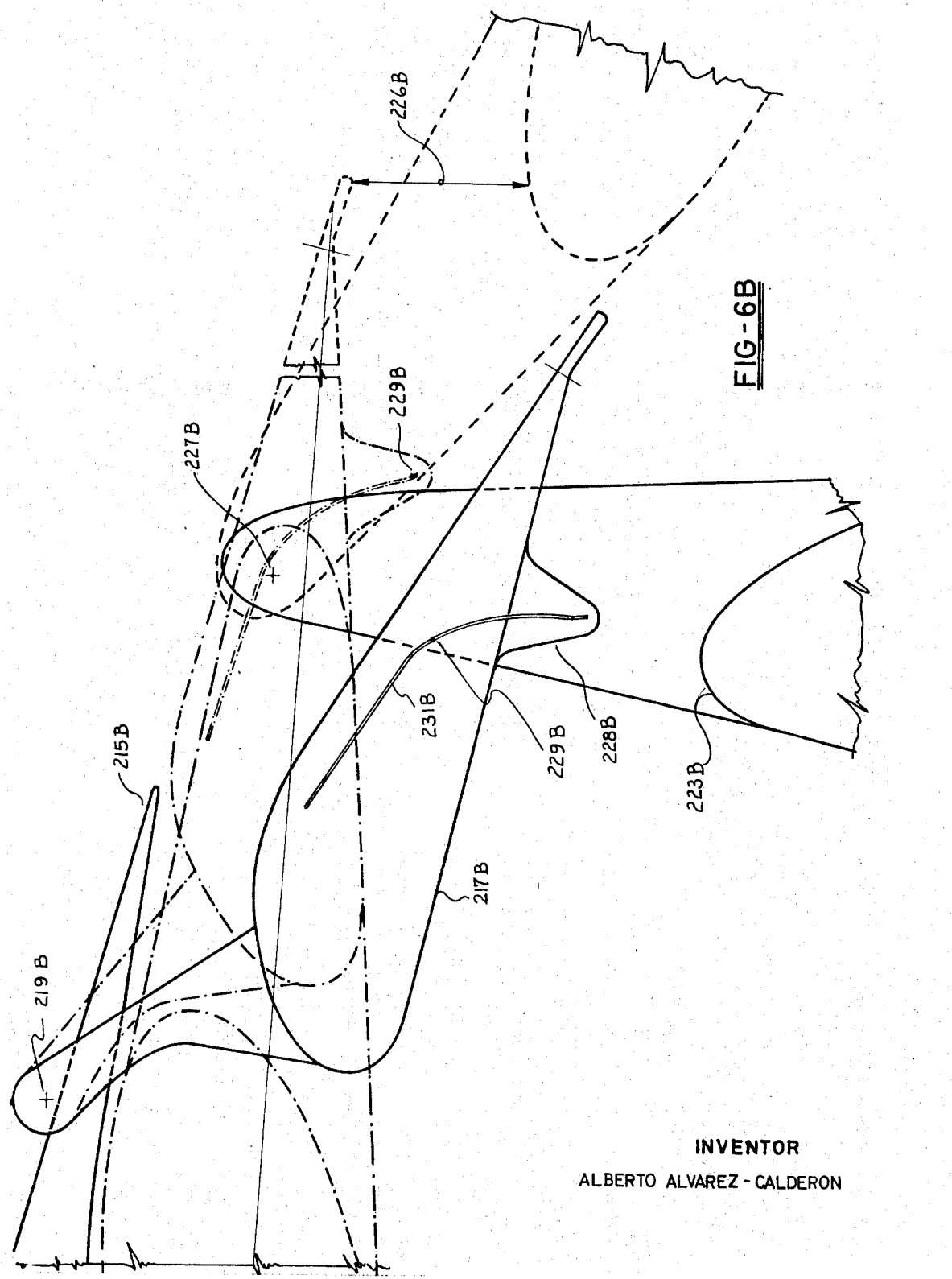

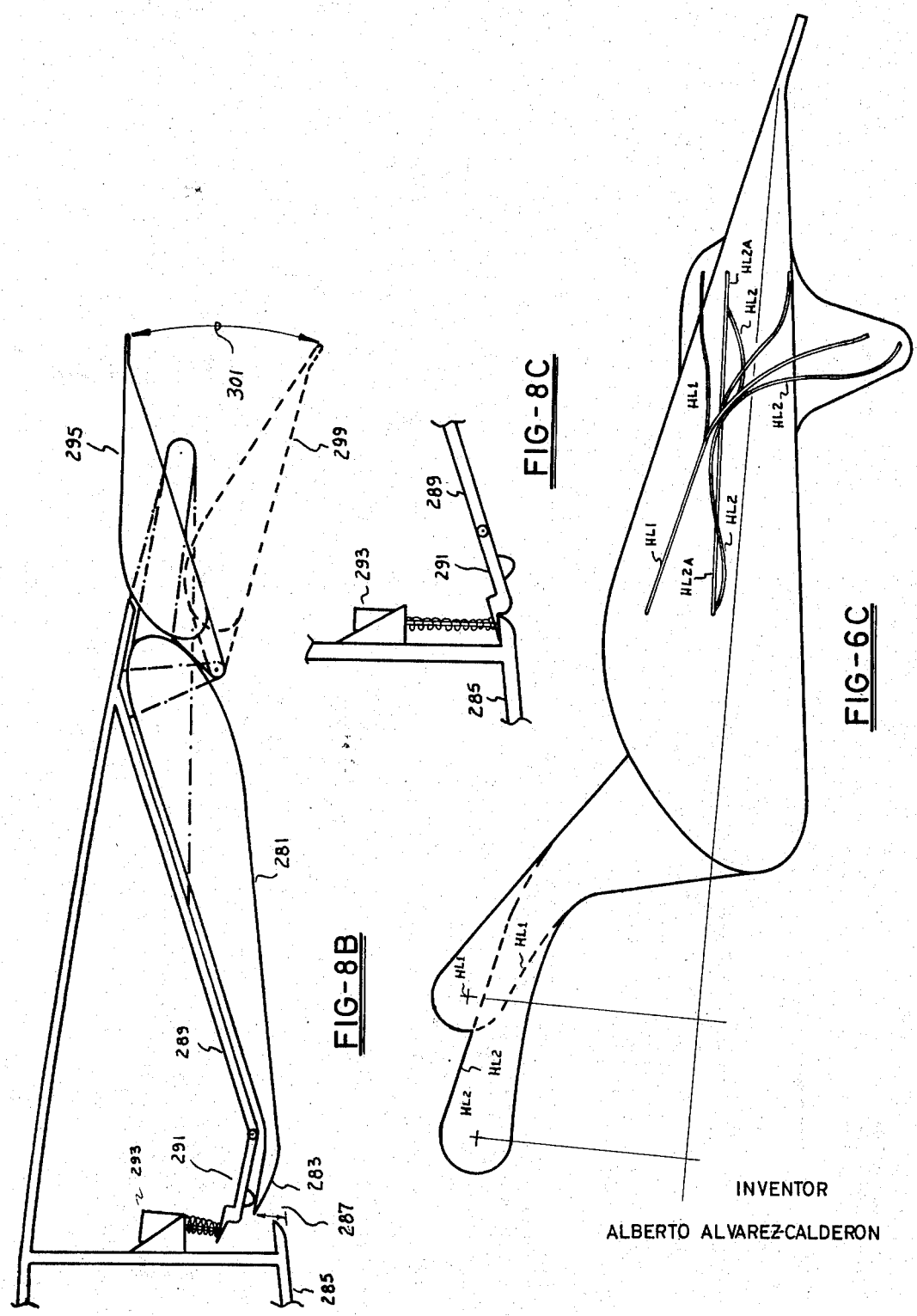

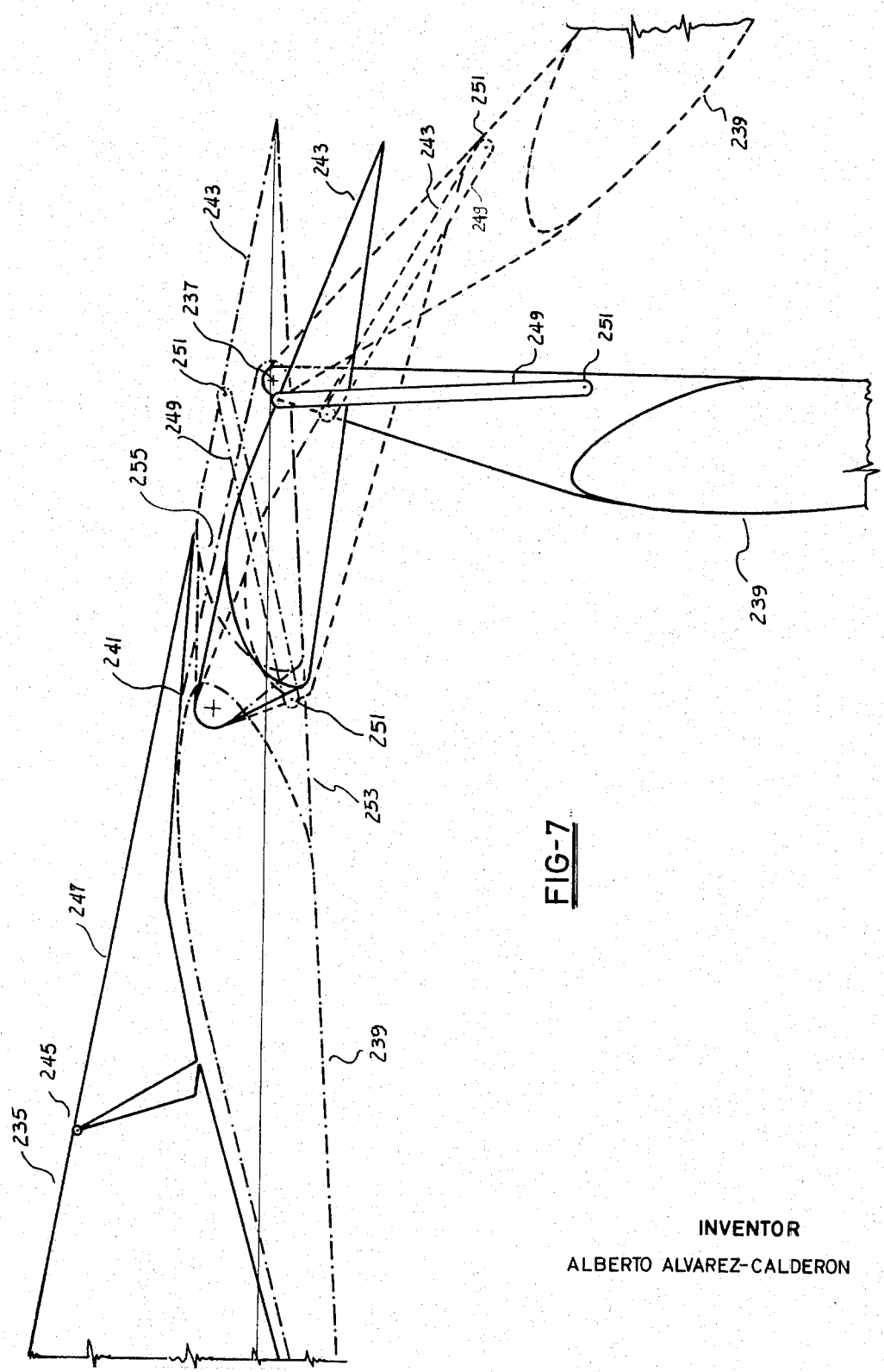

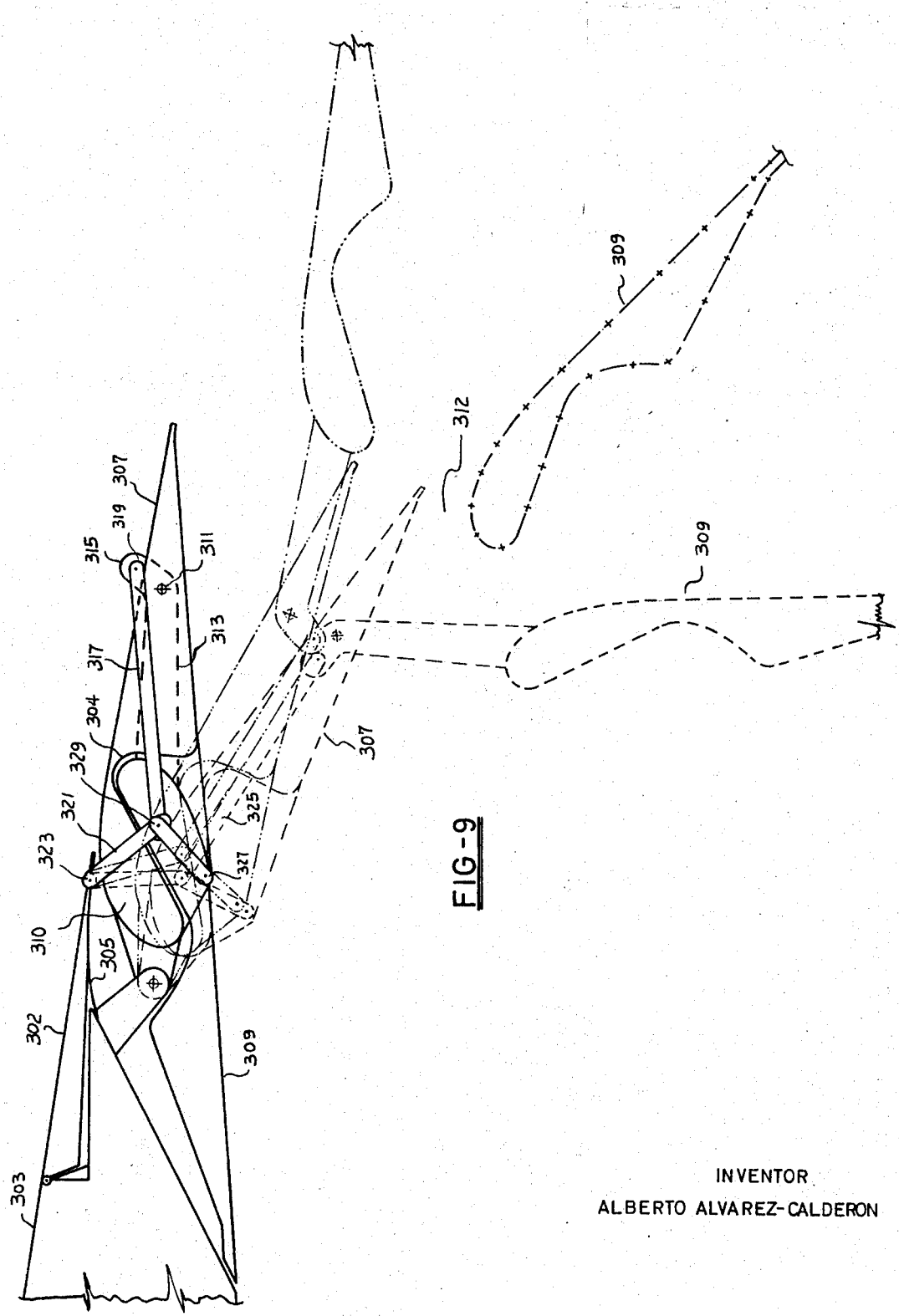

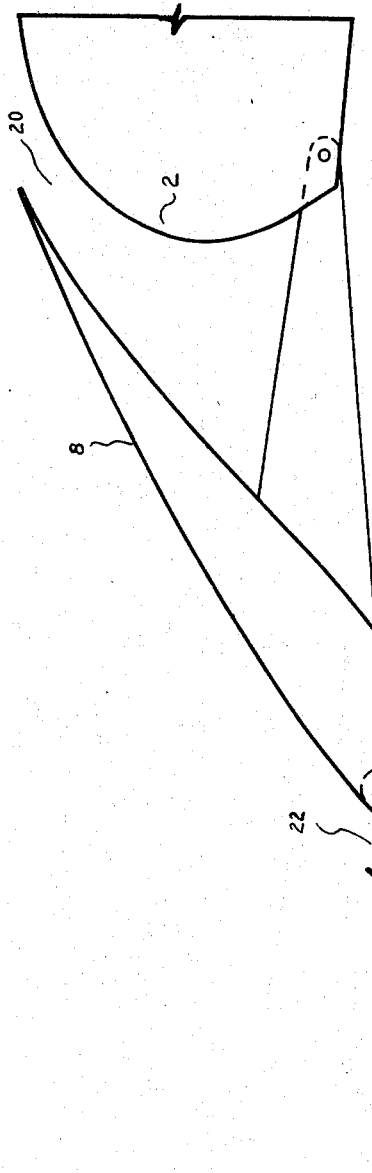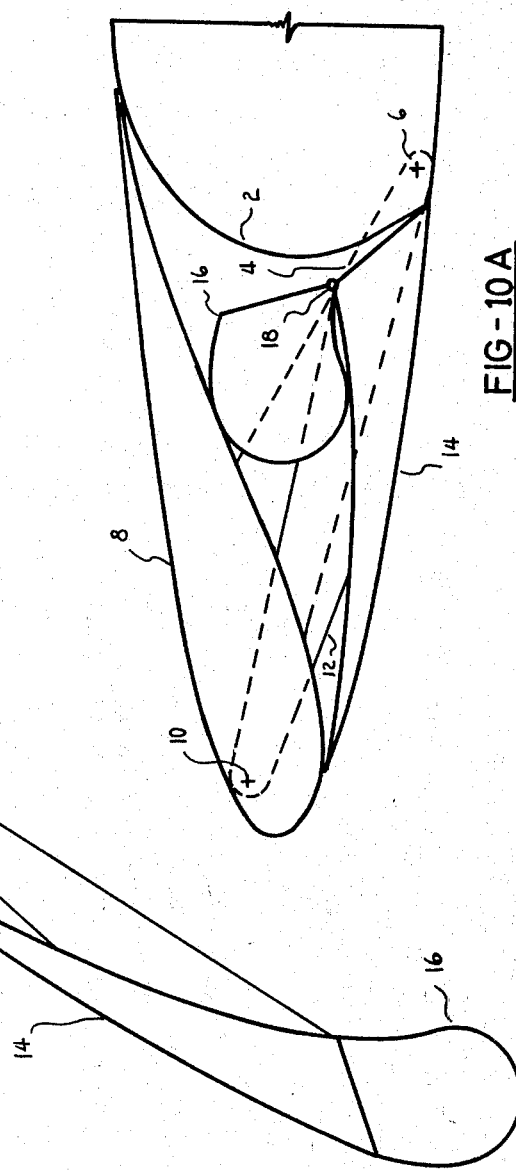

United States Patent Office 3,371,888
Patented Mar. 5, 1968

3,371,888
INVERTING FLAP SYSTEM
Alberto Alvarez-Calderon, Av. Salaverry 3465,
Orrantia del Mar, Lima, Peru
Filed July 12, 1965, Ser. No. 471,274
25 Claims. (Cl. 244—42)

This invention relates to aircraft. More particularly it relates to flaps and wings of the type described in my U.S. Patent 3,126,173.

I have designed, built and flown successfully, a flap of a type described in my Patent 3,126,173 and have invented improvements and new systems related to it which are specified in this application.

Since my Patent 3,126,173 specifies very clearly the fundamental aerodynamic, structural, and mechanical characteristics of my flap, these will not be described again here. Throughout the present specifications, and in the claims, I will use the term inverting flap or inverting airfoil to denote a movable trailing edge surface which is articulated adjacent the trailing edge of the wing or primary airfoil, and has a retracted high speed position contiguous to the under surface of the wing or primary airfoil from which it can be extended by angular motion about its articulation which inverts the inserting airfoil or flap and places it in an area-increasing position in which lift and/or drag control forces are increased. This structure is shown in all of the figures in the specification, for example inverting flaps 45 and 185 of FIGS. 3 and 5 respectively. In many cases, my inverting flap is shown combined with various types of auxiliary flaps and spoilers, and various excellent mechanisms to operate the inverting and auxiliary airfoils are shown. The scope of my invention will be better understood by reviewing its objects and purposes as follows.

It is one purpose of my invention to prescribe special positions for my inverting flap which minimizes pitching moments due to flap but retains excellent lift and drag characteristics.

Another purpose of my invention is to prescribe inverting flap positions which reduce minimum control speed of twin engine aircraft.

Another object of my invention is the prescription of inverting flap positions to be used with deflected slipstream STOL aircraft in approach and landing.

Yet another object of my invention is to specify flap retraction mechanisms for my inverting and auxiliary flaps.

Another object of my invention is to specify new variations of double and triple slotted flap arrangements specially suited for thin airfoils.

Another object of my invention is to specify the geometry for high lift slot shapes both for take off and landing with my inverting flaps and auxiliary flaps.

Another object of my invention is to specify special combinations of spoilers with my inverting and auxiliary flaps as a high speed ventilated brake and as slow speed brakes.

Another object of my invention is to specify new structures for extending the chord of my inverting flap without altering the structure of the wing to receive the retracted flap.

Another object of my invention is to specify new shapes for my inverting flap which minimizes drag criticalities of the retracted flap.

Another object of my invention is to specify new inverting flap retraction procedures which minimizes flap drag during retraction.

Another object of my invention is to specify the shape of a reversible camber auxiliary airfoil in combination with my retracted inverted airfoil.

These and other objects of my invention will become more readily apparent from a perusal of the drawings of the invention, in which, FIGURES 1A and 1B show low pitching moment flight positions for my inverting flap which are compared with high pitching moments of a standard flap in FIG. 1C.

FIGURES 3A to 3E show a double slotted inverting flap arrangement with a cable actuator system of a type I have tested in flight, and a spoiler, in various flight positions.

FIGURES 4C to 4G show the type of wing of FIG. 4A at various stages of flap retraction.

FIGURES 5A and 5B show a triple slotted arrangement for my inverting flap.

FIGURES 5C and 5D show a four slotted arrangement for my inverting flap.

FIGURES 6A to 6C show in large scale cam and cam slot systems to operate my auxiliary flaps with motion of my inverting flap.

FIGURE 7 shows a special link arrangement to operate my auxiliary flap.

FIGURE 8 shows an embodiment of my invention suitable for modification of existing aircraft.

FIGURES 8B and 8C show low drag and camber reversing arrangements for my inverting flap.

FIGURE 9 shows a special linkage system to operate my auxiliary flap and inverting flap.

FIGURE 10 shows a special leading edge high lift device.

Figure 1A:
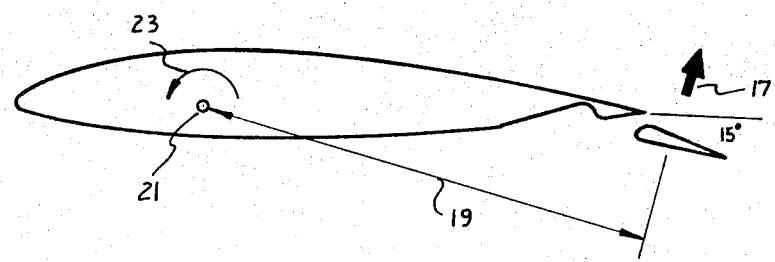
Figure 1B:
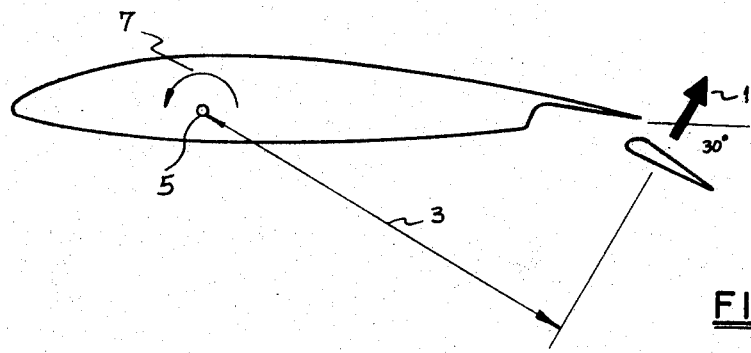
Figure 1C:
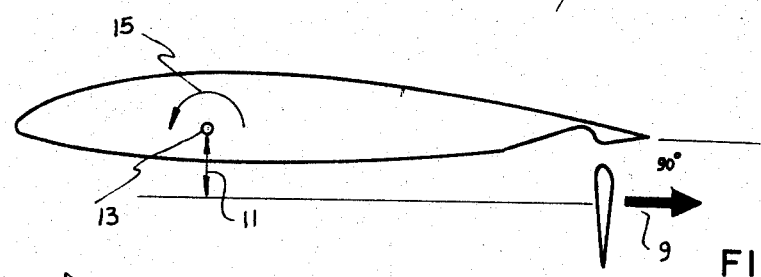

With initial reference to FIGURES 1A, 1B and 1C, I prescribe positions for my inverting flap which are useful to minimize wing pitching moments. It has been the case with previous area increasing flaps, for example the Fowler flap, to use a flap deflection of about 30° for landing, as is shown in FIGURE 1B. However, large pitching moments appear because the large flap force 1 acts at a large distance 3 from aerodynamic center 5 of the wing, to produce a large pitching couples 7. This is undesirable. With conventional criteria for area increasing flaps, for landing my inverting flap could be used at 30 degrees, if large pitching moments are acceptable. However, I have discovered and proven in flight test that with 90° deflection for landing there is a smaller pitching moments than with 30° flap and more lift and drag. With 90° flap, flap force 9 acts at a small distance 11 from aerodynamic center 13 to produce small pitching couple 15. As is evident by inspection of FIG. 1B, distance 11 between line of action of resultant force vector and aerodynamic center 13 is of the order of the chord of the inverting flap. Since in take off I use a small flap deflection as shown in FIGURE 1A in which small flap force 17 acts at a long distance 19 from aerodynamic center 21 to produce a small couple 23, it is evident that with the angular deflections I prescribe in FIGURES 1A and 1C for landing and take off, I can operate my inverting flap avoiding the well known adverse pitching moments of the usual area increasing flaps like that of FIGURE 1B. It is well to note that the usual sliding flaps cannot be deflected 90° because of shake problems, whereas my inverting flap at 90° is very rigid as is shown for example, in FIG. 3C.

Figure 2:
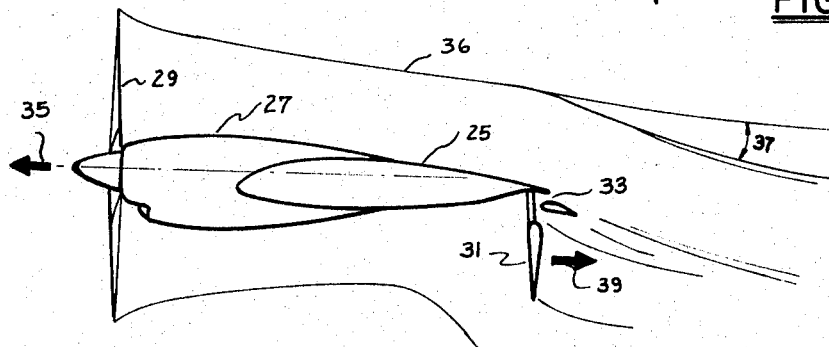
FIGURE 2 shows my inverting flap on a deflected slipstream twin engine aircraft.

With respect to FIGURE 2, I show a wing 25 having an engine nacelle 27 and a propeller 29, and a double slotted flap 31 with the small-chord auxiliary flap 33 at about 30° and my inverting flap at about 90°. The propeller produces a thrust 35 and a slipstream 36 which is deflected by angle 37. This figure illustrates two new applications in which my inverting flap cooperates in a unique way with the propeller. These are the following cases.

For steep STOL approach it is necessary to produce strong slipstream lift without, however, accelerating the airplane forward. This can be done with my 90° inverting flap because large flap drag force 37 permits the augmentation of propeller thrust 35, thereby increasing the flow rate of slipstream 37 which when deflected by angle 37 improves lift without forward acceleration. Thus there is special cooperation in using my inverting flap at about 90° since this permits larger thrust for steep approach of STOL aircraft.

FIGURE 2 also describes a unique feature of yaw control in single engine flight at maximum power of a twin engine aircraft. Normally, at maximum value of thrust 35, there is produced in single engine slow speed flight a yaw couple due to thrust which can yaw the airplane asymmetrically out of control at very slow speeds. However, with my inverting flap force 37 obviously cancels out an important portion of asymmetric thrust 35, rendering the aircraft completely controllable in yaw during single engine flight. I have test flown this feature in a Beechcraft 18 airplane which with my 90° flap had its minimum control speed in yaw reduced from 88 miles an hour to 51 miles an hour, which is well below the approach speed of the airplane with the new flap, thereby rendering the Beechcraft 18 a safe airplane for STOL flight without any change of tail surfaces.

With respect to FIGURES 3A to 3E I show in side view a flap retraction system I have built and test flown for my inverting flap on a Beechcraft 18; these figures, however, show the retraction system installed with a double slotted version of my flap in a thin wing having a special spoiler. Specifically in FIGURES 3A to 3E I show a fixed wing trailing edge portion 41 which has a fixed flap support bracket 43 supporting inverting flap 45 at pivot axis 47; auxiliary rear flap 49 is supported at pivot axis 51; spoiler 53 is supported at hinge axis 55. To move the flap 45 from the retracted position of FIGURE 3A to any of the extended positions it is necessary to pay out cable 57 which evidently will permit flap 45 to move counterclockwise say to the position of FIGURE 3B.

In FIGURE 3B the cable arrangement is seen in greater detail: cable 57 is attached to flap 45 as is shown in portion 59 in which the cable is seen to be connected through flap 45 round the base of bracket 61. The cable runs between cable guards 63. FIGURE 3B is actually a high speed brake position in which my flap 45 is deflected downward by a small angle to create a large drag with little change of trim. The latter is due to 53, which should be opened as shown in the figure whereby high pressure flows between the inverting flap and the wing can be evacuated by path 73. From the kinematics of FIGURE 3B, it is also seen that the power required to retract flap 45 even at very high speed is small because of the relatively large distance between the line of action of cable 57 with respect to axis 47, which is denoted as distance 75.

Upon further paying out of cable 57 round pulley 65 and 67, the flap arrives to a landing and/or brake position approximately perpendicular to the wing as shown in FIGURE 3C, with cable 57 resting against the protruding vertex of bracket 61. FIG. 3C also shows my spoiler 53 moved upwards approximately 90° in a brake position to be used after touch down to cooperate with my flap 45 and present the maximum possible aerodynamic drag for deceleration. Notice in FIG. 3B the extremely efficient determinate truss flap support which takes the large flap drag force 69. This truss is defined in this and other figures, by elements 45 and 43, with cable 57 being an efficient tension member of the truss which prevents flap buffet. FIGURE 3C also shows that the power required to retract the flap against load 69 with cable 57 is small because of the large moment arm between line of action of 57 and pivot axis 47, denoted as distance 71.

In FIGURE 3D I show one take off position of my inverting flap in which to reduce slot drag I have deflected downwards my spoiler by an angle 77 such that it contacts smoothly auxiliary flap 49; auxiliary flap 49 has its door faring 79 deflecting smoothly the airflow into principal slot between 49 and 45 across which high lift flow 81 exists over my extended inverting flap. Observe how the upper surface of wing 41 fairs gently to the upper surface of spoiler 77 and thence to the upper surface of auxiliary flap 49 to provide a smoothly bent upper surface adjacent to which attached airflow can exist towards slot 81 and on top of flap 45. Also observe that the power to retract flap 45 is small because of large distance 83 between axis 47 and cable 57; as may be evident by inspection the depth of bracket 61 contributes to about 30% of distance 83 thereby increasing also the rigidity of the truss system. It is then evident that bracket 61 is of tremendous advantages to decrease the power required for the retraction system as well to decrease the tension in cable 57 which can approach intolerably high levels unless a bracket 61 is provided. However, the attachment of cable 57 should not be at a fixed point at the lower tip of bracket 61 as would be normal engineering practice because if it were so, tension in the cable would not fully retract the flap. Evidently when the flap approaches its fully closed position the line of action of the cable would tend to pass through axis 47 and no more angular motion to flap 45 about axis 47 would be possible. This becomes more evident by examining FIGURE 3A and realizing that it is by virtue of the way cable 57 is attached to the root of bracket 61 adjacent to the face of the inverting airfoil opposite to bracket 61 (rather than at the vertex of 61), that the line of action 87 of the tensioned cable passes well below axis 47 by a distance 89, thereby tending to close my flap at all times. If the cable were attached to the vertex of bracket 61 instead of add its root, the cable's line of action would have been 91, obviously tending to open the flap with cable tension rather than closing it.

Therefore my design for the attachment of the cable to the flap has been shown to be very important.

With respect to FIGURE 3E I show a special flap position for slow speed loiter in which auxiliary flap 49 is approximately horizontal, spoiler 53 is raised to open a large slot for low drag flow, and flap 45 has very little deflection with respect to wing 41. Again note that a large distance 93 is retained by virtue of the depth of bracket 61 which accounts for over 40% of distance 93. It should be remarked that a loiter position could also use spoiler 53 in its fully downward position in order to minimize slot drag.

I will now show in connection to the retraction system described in FIGURES 3A to 3E a partial isometric view of a typical installation showing the actuator system which I have tested on a Beechcraft 18 type airplane using a pulley and drum method. Specifically FIGURE 3F shows mounted on a rear face of wing spar 41 a drum 97 which serves to pay out or wind-up cable 57. Drum 97 may be driven by an electric motor inside the drum, or hydraulically. Cable 51 follows pulleys 65 and 67 to operate the flap in the manner shown in previous figures and also sketched in FIGURE 3G. It is evident from FIGURES 3A to 3E that once the flap starts down from its fully-retracted position, airloads will always tend to maintain the cable in tension. Indeed, this I have tested in flight. To initiate downwards motion of the flap when it has positive pressures in its retracted position, there can be provided a spring 101 which pushes out the flap when the cable is payed out to provide aerodynamic forces which continue to open the flap. This is all that is required to have the flap fully operative during flight. On the ground, however, there are no air forces to provide tension on the cable thus a spring arrangement can be mounted to provide flap motion on the ground if this be necessary. In FIGURE 3F on the right hand side of the fuselage there is shown a coil spring method in which the spring is pre-loaded to maintain flap 45 tending to open at all times about axis 47, independent of dynamic pressures. On the left side there is shown a cam and spring combination having a spring 103 with a cam 105 and a bracket 107 which would operate the flap in the manner show in FIGURE 3G in which obviously the tension of spring 103 tends to rotate arm 107 counterclockwise. This in turn tends to rotate flap 45 in a counterclockwise sense and maintains tension of cable 57 at all times. Evidently it is desirable to maintain tension on cable 57 against the drum. This can also be done as shown in FIGURE 3F by providing an auxiliary cable 109 which through auxiliary pulley 111 returns to the drum in a closed circuit and maintains tension of cable 57 against the drum at all times.

Figure 3F:
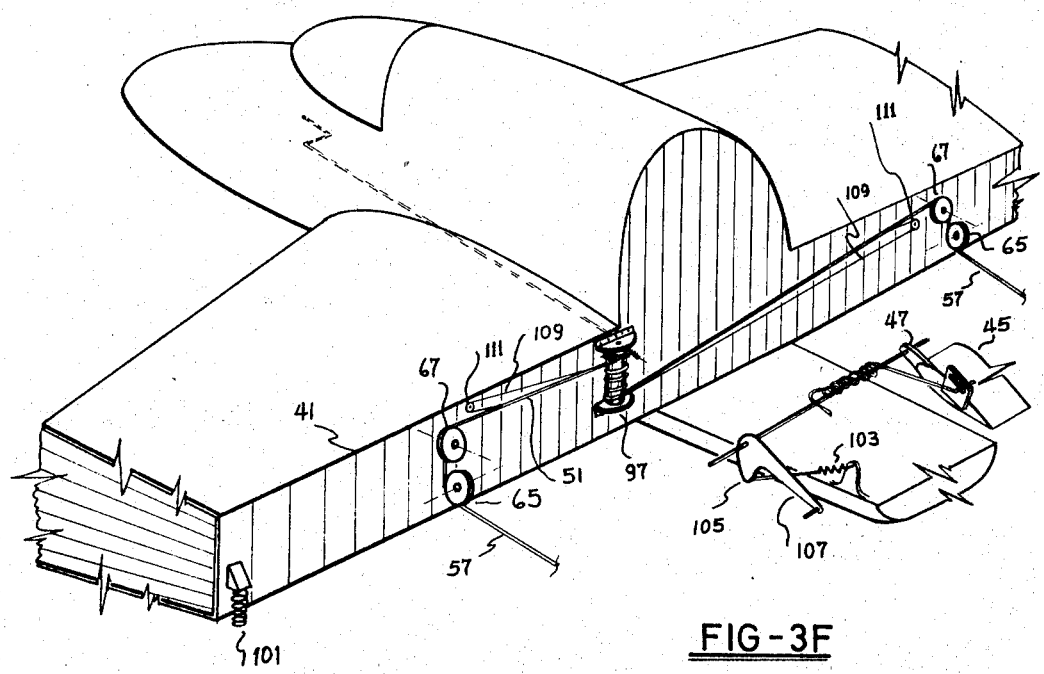
FIGURES 3F to 3I show details of the retraction system of the flap of FIGURES 3A to 3E.
Figure 3G:
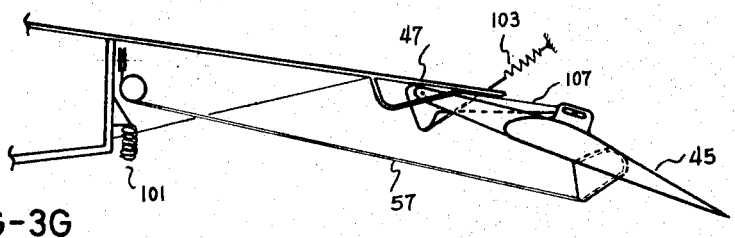
Figure 3H:
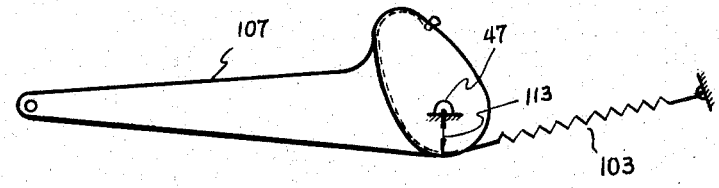
Figure 3I:
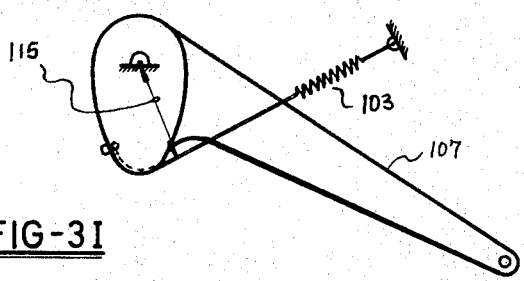

FIGURE 3H shows a design for arm 107 in the fully retracted position showing how, even though tension of spring 103 is large the torque about axis 47 due to that tension, against which flap motor has to act, is small because of small moment arm 113. FIGURE 3I shows how when spring 103 is allowed to rotate arm 107 (by paying out cable 57 of flap) it can produce large torques, because even though tension in 103 has decreased, moment arm 115 has increased considerably. Thus, as shown in FIGURE 3G, arm 107 can support fully extended flap 47 on the ground against its own weight. Thus, by varying moment arm between line of action of spring and center of rotation of arm, the torque provided by the spring against which the flap motor has to act can be kept approximately constant and at a minimum adequate to support the flap in its fully open position.

Figure 4A:
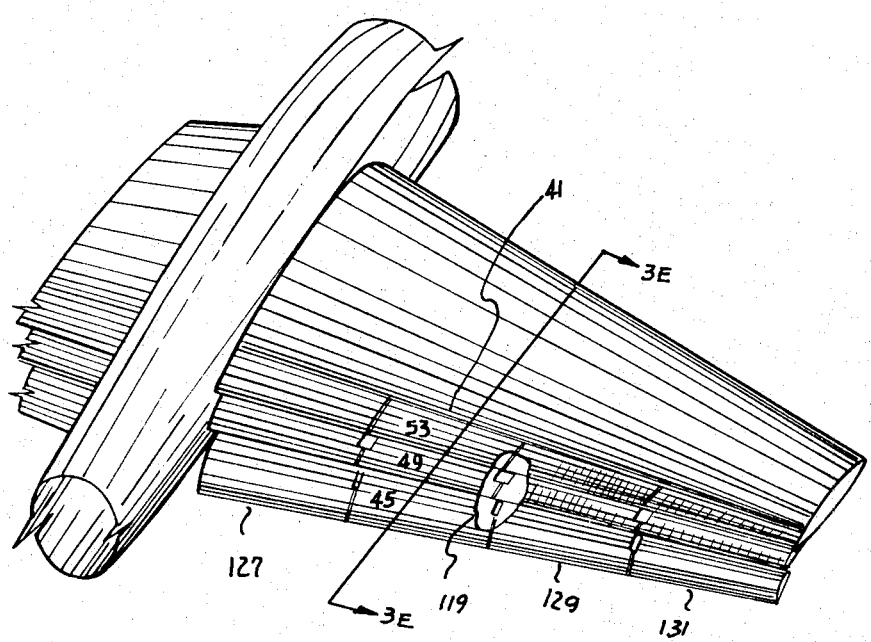
FIGURES 4A and 4B are isometric views of the flap support system for the structure of FIGURES 3A to 3E.
Figure 4B:
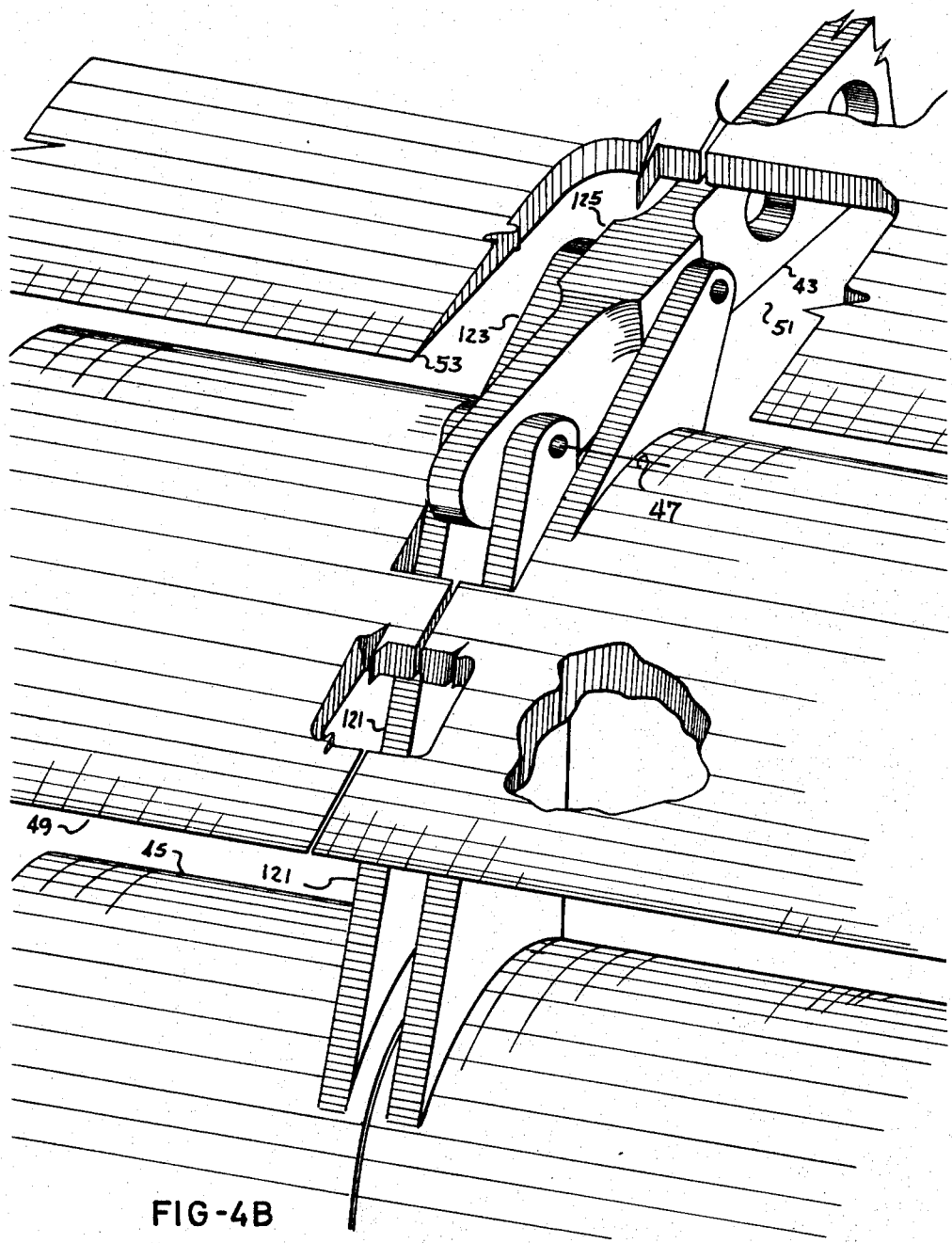

I will now describe in greater detail the structural supports for the type of auxiliary flap 49 and my inverting flap 45 described in FIGURE 3; this I do with the aid of FIGURES 4A and 4B. Specifically, FIGURE 4A shows an isometric view of a right wing panel having the type of spoiler and flap arrangement shown in FIGURES 3A and 3B; FIGURE 3E can be interpreted as section IIIE of FIGURE 4A. Thus the wing shows a rear wing portion 41, a spoiler 53, an auxiliary flap 49 and inverting flap 45. The details of the flap support brackets and hinge lines pertaining to area like 119 are shown with greater clarity in FIGURE 4B. It should be noted how wing bracket 43 supports inverting flap 45 at pivot axis 47 by means of flap ear bracket 121; the auxiliary flap 49 is also supported to wing bracket 43 at axis 51 by means of auxiliary flap ear bracket 123. Note, however, that 43 is provided with a lateral protrusion 125 which serves to space bracket 123 outboards of the side surface of 43; the resulting gap between 123 and 43 permits the location of bracket 121 next to the side surfaces of 43 with freedom of motion of 45 and 49 with respect to each other. Thus as seen in my FIGURE 4B the structural arrangement for my auxiliary flap and main flap is extremely simple and yet very rigid and aerodynamically efficient, since the spanwise continuity of flaps need not be segmented by a large gap.

Note that in FIGURES 4A and 4B I have designed the flap supports and flap elements to permit independent motion of adjacent panels of the flaps. This I have done for a special purpose which will be evident with the aid of FIGURES 2 and 4 as follows:

It is evident that during retraction of the flap after take off there is a drag increment period which is perfectly tolerable if flap retraction is made quickly, as I have shown in test flights of a Beechcraft 18 airplane. However, for aircraft having full span flaps it may be structurally more practical to retract the span flap panels in succession rather than simultaneously. In this way a single energy source can be used in succession to retract small flap panels in succession, rather than retracting the complete flap at once which would evidently require more energy. Furthermore, by rapidly retracting the flap panels a large drag increment is not felt all at once by the aircraft but smaller amounts are felt for a slightly larger time. For example, in FIGURE 4A rather than retracting the entire full span inverting flap at once, the inverting panels are adapted to be retracted with panel 131 first, followed by panel 121, followed by panel 45, and followed by panel 127, which evidently would be smoother and require less energy than a simultaneous retraction of the complete full-span inverting flap. To handle the independent retraction of each panel, evidently all that is necessary is to have 4 independent installations of the type shown in FIGURE 3F, with each drum having its own motor. In an alternate arrangement, four drums could be grouped together around a single energy source which could be applied to each drum consecutively. The independent installation in which each drum has his own motor has the advantage of maximum reliability because motor failure would not occur to more than one panel at any time; the alternate solution has the advantage of light weight.

It is pertinent to mention at this time that my flap design has special advantages for manual operation. Evidently since flap extension is aided by the air pressures for all flap positions, as shown in FIGURES 3A to 3E, manual extension of the flap even for very large aircraft is perfectly feasible. A worm and gear arrangement or manual operation from the cockpit is shown in FIGURE 3F; another possibility would be to have small auxiliary batteries or hydraulic supply for the drum's motor, which could operate the flap to open it in case of failure of the main energy system. Since retraction of flap by an auxiliary method would require a fairly long time there are advantages in dividing the flap panels to reduce loads of manual retraction. I have discovered however that for simulated flap failure it is advantageous to continue flight with the flap fully extended in a low drag position which is shown for example in FIGURE 3E since the additional drag due to the flap would be almost negligible. Thus flight would be continued to final destination, or the aircraft could be landed for repair of the flap's retraction system.

To illustrate better the successive retraction of flap panels discussed in reference to FIGURES 4A and 4B, I refer to FIGURES 4C to 4G. FIGURE 4C shows a wing panel 133 having my inverting flap panels 135, 137, 139 and 141 fully extended; also shown are spoiler ailerons 143 and 145. When retracting the flap after takeoff, firstly inverting panels 135 is retracted and the wing looks as in FIGURE 4A; immediately after panel 137 is retracted and the wing looks at the FIGURE 4E; immediately thereafter panel 139 is retracted and the wing looks as in FIGURE 4F; immediately thereafter the last panel 121 is retracted and then the wing looks as in FIGURE 4G in its high speed configuration. It is evident by inspection of FIGURES 4C to 4G that the drag of each retracting panel is not larger than say that of a wheel, thus the retraction process is dragwise as smooth and simple as that of retracting a landing gear. Flap extension can be made also by successive opening of individual panels.

I will now discuss special improvements for additional high lift slots and/or wing camber for a wing having my inverting flap. In FIGURE 5A I show a wing trailing edge portion 145 which on bracket 147 supports an auxiliary flap 149 at hinge axis 151 located adjacent to the upper surface of the basic airfoil and at a distance ahead of the trailing edge of spoiler 153 of approximately 40% of the chord of 153; 151 is also upstream of the leading edge of 149 by approximately 40% of the chord of 149. Bracket 147 also supports my inverting flap 155 which has a fixed vane 157 defining a slot 159 which is covered by door 161 mounted on 149. Wing 145 also has spoiler 163. The structure in FIGURE 5B is shown in the high speed position; in FIGURE 5A it is shown in a high lift position in which 149 has angular motion to increase camber and by virtue of length of 147 also is moved downwards to permit a downward deflection of element 153 to increase the camber of 145 as well as define a high lift slot 165 for flow 167. The trailing edge of 149, together with the slot of 155 defines a second slot 169 for fluid flow 171, and slot 159 reinforces flow 171 with flow 173. Therefore, the entire flow field on top of the wing can be bent smoothly by about 60° with the aid of the flap deflections and slot flows 167, 171 and 173.

Even a more advanced arrangement is shown in the four-slotted flap of FIGURES 5C and 5B in which all the flap elements only used pivotal motion. On wing 175 there is mounted main flap support bracket 177 having an auxiliary flap 179 with door 181 and hinge axis 183. My inverting flap is 185 having a slot 187. There is a spoiler 189. So far the structure is very similar to that of FIGURES 5A and 5B. However, in FIGURES 5C and 5D I show a secondary flap 191 hinged at 193 to bracket 177, and I also show the extremely simple cam and cam slot means to automatically operate all the flaps at the same time by virtue of the motion of the principal inverting flap. I therefore, show that in arm 195 there is a pin which is inserted in slot 197 at an end-rib of 191 such that when 179 moves angularly about 183, 191 by means of the pin and slot system moves about hinge 193, and this angular motion defines a first slot 199 between spoiler 181 and flap 191; it also sets the correct gap for slot 201, between 191 and 179. Now 179 is acted by a cam device comprising a pin 203 on arm 205 of my inverting flap 185, the pin is inserted on slot 207 at an end-rib of 179 such that when flap 185 is actuated by a device of the type shown in FIGURE 3, then 179 defines a slot 209 between slat 211 and element 179. Note that flap 179 has a small cam extension means 213 projecting behind the trailing edge to extend the range of operation of cam slot 207. It is evident that the high lift characteristics as well as structural and mechanical simplicity of my four slotted design of FIGURES 5C and 5D exceeds anything that has been proposed in the past in the flap art.

FIGURES 6A, 6B, 6C, show in greater detail the cam means to operate my auxiliary flap by means of the motion of my inverting flap. FIGURE 6A shows a trailing edge 215 which could be that of a wing or of a spoiler. It shows solid lines for auxiliary flap 217 supported at axis 219 by means of auxiliary flap bracket 221. The principal inverting flap is shown in a 90° position as 223 supported by bracket 225 to hinge axis 227. Therefore the solid line position of 217 corresponds to the 90° inverting flap position. In this position a pin 229 mounted on 225 engages cam slot 231 in auxiliary flap 217, to set 217 at about 30°. The combination has very high lift and high drag and low pitching moments; special high lift advantages are had by the downward deflection of auxiliary flap 217 since lift is increased by having a stronger downwash flow from the top of the wing induced by the slot between 217 and 125. When flap 223 is retracted to the dash dot position, pin 229 evidently displaces itself along cam 231 to close the high lift slot and raise flap 217 to the position shown in dash dot lines in which it constitutes the trailing edge of the wing. If, however, from the 90° flap position the inverting flap is extended counterclockwise to its takeoff position shown in dash lines, pin 229 slides along cam slot 231 in its curved portion, which raises slightly auxiliary flap 217 to its dash line position wherein the complete combination defines an efficient double slotted drag high lift flap system, as is evident by inspecting the slots between 215 and 217 in their dash line positions, and the slot between 217 in its dash line position and 223 in its dash line position.

It is seen that the cam arrangement permits to vary the orientation and high lift slot of my auxiliary flap according to the designers choice in a structurally and mechanically simple way.

The figure I have just described pertains to a typical double slotted installation similar to that of FIGURE 4 of my U.S. Patent 3,126,173 or those of my FIGURES 3, 4 and 5 of this application. FIGURE 6A corresponds to a overall flap chord of approximately 61 centimeters in which the auxiliary airfoil measures 19 centimeters in chord and my inverting flap has 41½ centimeters of chord; the location of hinge line 219 is seen adjacent to the upper surface of the wing on top of the leading edge portion of the retracted inverting flap or airfoil and upstream of the auxiliary flap or airfoil; the pivoted axis 227 is seen located adjacent the lower surface of the wing or primary airfoil and to the rear of trailing edge 215 midway of the retracted auxiliary flap or airfoil.

A somewhat different arrangement of the same dimensions is shown in FIGURE 6B in which the numbers used to identify the parts of the structures have a subscript B; the elements of the structure are the same as for FIGURE 6A and their enumeration will be omitted here, except for the following points of difference between FIGURES 6A and 6B. In FIGURE 6B, pivot axis 219B is on top of the upper surface of the wing and much closer to the leading edge of airfoil 217B. Pivot axis 227B is between the upper and lower surface of the wing or airfoil instead of adjacent to its lower surface, cam slot 231B protrudes below the lower surface of 217B by means of ear extension 228B. One main point of difference which results from the shape of the cam slot is that, whereas at 90° position shown in solid lines the flaps have a double slotted arrangement, in the take off position of my inverting flap shown in dash lines, by virtue of the shape of slot 231B, pin 229B raises airfoil 217B to its dash line position coinciding with its fully retracted position. Therefore, only 1 slot is defined between 217B and 223B; this slot has a large slot gap 226B which favours low slot drag for take off; the elimination of the second slot for take off also reduces slot drag. Therefore FIGURE 6B varies the number of slots with flap detection by means of the shape of its cam slot.

In the preceding FIGURES 6A and 6B I have shown 2 sets of hinge lines with their corresponding cam slots and cam pins. Other cam set arrangements are possible for the same cam pins, and I show them as follows. In FIGURE 6C the hinge lines corresponding to FIGURE 6A are denoted as HL2 and the corresponding cam slots are also identified as HL2. The hinge lines corresponding to FIGURE 6B are identified as HL1 and the cam slots are also identified as HL1. Of particular interest for manufacturing purposes is slot HL2A, which is a straight line. It should be noted that some slots in FIGURE 6C bifurcate. Obviously only one branch can be used for a specific installation. Since the description of the shape of the cam slot by means of words could not give as accurate a representation as the figure, the figure itself has been drawn with great care.

I will now describe an alternate method to operate my auxiliary flap by virtue of the motion of the inverting flap. This I show in FIGURE 7 as follows: on wing 235 there is mounted at pivot axis 237 my inverting flap 239; at pivot axis 241 there is mounted my auxiliary flap 243. At hinge axis 245 there is mounted spoiler 247. In the retracted position the flap elements are shown in dash dot lines. When 239 is retracted, 243 is held fixed by a connecting link 249 with a pivot connection 251 at auxiliary airfoil 243 and pin connection 251 to bracket 253 of inverting flap 239. By inspection, when 239 is fixed, 243 is also fixed since 249 is attached at 251 separate from axis 241 and considerably below it, adjacent to the lower surface of the wing. When flap 239 is extended (as for example with the mechanism of FIG. 3) since pin connection 251 is eccentric to axis of rotation 237 of flap 239, there follows angular motion of 243 about axis 241. For example when 239 is in the 90° position shown in solid lines, link 249 which has moved downwards has also displaced surface 243 to its solid line position opening a slot 255 between spoiler 247 and element 243. Further, when flap 239 is moved to its take-off rear position shown in dash lines, link 249 obviously further lowers element 243 to its dash line position in which a second high lift slot is defined between 243 and 239 in their dash line positions.

It is important to note that in both of the mechanisms to actuate the auxiliary airfoil, namely that of FIG. 6A and that of FIG. 7, the load introduced by the auxiliary airfoil through its connection to the inverting flap in most cases acts to relieve the torques produced by the aerodynamic forces on the inverting flap, thereby decreasing the power required from the actuator to retract the inverting flap against the aerodynamic forces. It should also be noted that the connections between the auxiliary flap and the inverting flap are usually at the midchord of the auxiliary flap thereby taking a principal load of the small auxiliary flap and leaving relatively unloaded the ear bracket about which the auxiliary airfoil pivots.

I will now describe in FIGURE 8A a new unique and most advantageous flap design for the adaptation of my inverting flap to existing aircraft, and for applications to new wings having increased volume storage capacity useful, for example to carry fuel. While the structure of FIGURE 8A is of a generalized nature, it has application for the Douglas DC3 airplane and for the Cessna 310 aircraft. Specifically FIGURE 8A shows a wing having a trailing edge portion 259 having a lower structural skin 261 which normally would be exposed to the airstream; it also has a trailing edge 263 and an upper surface 262. The wing is shown of multi-stringer construction having stringers 265 and a rear web 267 attached to lower skin 261 at region 269. The wing described so far may be a typical construction for a wing using a split flap hinged at an axis parallel and contiguous to 269. Instead of using such a split flap, on the wing, which would have little effect on take off because of its high drag, I have shown installed instead my inverting flap 271 hinged at pivot axis 273; it can be operated by a cable system like that of FIGURE 3. The chord of my inverting flap would have normally been chosen by standard engineering practice to end at position 275 downstream of 269, and would have been retracted to have its downwardly facing surface at the same level with structural skin 261. However, I desire to increase the chord of my flap 271 beyond 275 without altering the structural surface 259. I do this by extending the chord of my flap 271 with a thin surface portion which can be stiffened by external chordwise stiffeners if desired, to region 277 below skin 261 overlapping it by a considerable length when the flap is retracted. Lower skin 261 is provided with a fairing 279 which streamlines the upstream edge 277 of flap 271 in the retracted position. In this way, I have succeeded in increasing the chord of my inverting flap by a substantial amount without altering the structural system of the wing itself or altering the position of web 267. Thus the structure described is specially practical to make an inexpensive installation as a modification to existing airplanes, with the modification being practical as well as aerodynamically most efficient.

In FIGURE 8B I show other improvements for my inverting flaps installation. I have found out that the retraction mechanism of the flap, like any other mechanical system, though fairly accurate, may some times have slight variations in its final positions. For example if the flap is retracted by an electric motor and the fully retracted position is signaled by an electric switch, the exact physical position of the retracted flap relative to the wing may vary slightly with the voltages and amperage of the electric source driving the flap motor. For example, if the switch is calibrated to stop the flap driven by a motor having a newly charged battery, when the battery is discharged slightly, that switch calibration will leave the flap protruding slightly below the wing. Since in this condition it is the sharpness of the upstream edge of the retracted flap which would protrude below the lower surface of the wing the reason that causes drag increment, it is convenient to avoid the sharpness of any protrusion of the upstream edge of the retracted flap. This I show in FIGURE 8B by shaping the thin edge of the flap as follows: on inverting flap 281 there is provided a cusped trailing edge region 283 which when the flap is normally retracted is located above the lower surface 285 of the wing by distance 287. Therefore, if the closed position becomes uncalibrated by an amount 287 there will still be no protrusion of a sharp edge below surface 285 and any change of drag would be negligible. This design solution is a practical feature; the cusp also increases the camber of the flap, which is favourable.

The structure of FIGURE 8B also shows that to allow for the retracted cusp, under surface 289 is provided with an articulated plate 291 which itself can actuate an electric switch 293 when contacted by flap 283. When 291 is not in contact with the flap it takes a position shown in FIGURE 8C showing a low drag undersurface skin arrangement leading smooth flows to the high lift slot.

FIGURE 8B also shows an auxiliary flap 295 hinged at 297 which in cruising position can be permanently deflected upwards as shown, according to the teachings of my U.S. patent application 263,217 of Mar. 6, 1963. It should be noted that in FIGURE 8B there is peculiar cooperation between the convex surface of 281 facing downwards, and the downwardly facing surface of 295; both cooperate to provide a gently reversing curvature for the airfoil of FIGURE 8B. The reverse curvature also allows to increase the convexity of design of 281, which favours high lift in the extended inverting flap position.

To conclude the description of FIGURE 8B I show that for a full span installation of my flap 281 (as is shown, for example, in FIGURES 4C to 4G), element 295 can act as an aileron in positions 299 at angle 301.

In FIGURE 9 I show a special actuator system for my inverting and auxiliary flaps illustrated for the case in which my inverting flap is mounted on an auxiliary flap instead of on a fixed flap bracket on the wing. Specifically I show wing trailing edge 303 supporting at hinge axis 305 an auxiliary flap 307. Flap 307 supports inverting flap 309 at axis 311 by means of bracket 313 having an eccentric portion 315. In the position shown in solid lines, the structure is in its high-speed retracted position. The inverting flap 309 may be actuated by a cable device of the type described in FIG. 3. However, it becomes necessary to coordinate the deflection of 309 with that of 307 to define the proper slots. This I do with a three link mechanism comprising link 317 connected at axis pivot 319 to portion 315 of bracket 313; link 321 connected to the wing 303 at axis 323 and link 325 connected to flap 307 at pivot 327. Links 321, 317, 325 are connected to a common pin 329. The location of the links and their sizes have been studied for good aerodynamic characteristics of the slots as shown in the figure. Link 321 and 325 extend rearwardly forming a rearward V shape at the vertex of which there extends rearwardly link 317 defining approximately the shape of horizontal Y. When my inverting flap is rotated downwardly to the 90° position shown in dash lines, link 317 obviously spreads out the V of link 327 and 321 and defines the approximate shape of the letter T instead, which is shown by the dash line of the links. Note that 307 in its dash position is inclined downwardly by about 30° to increase the camber of 303 and provide a high lift slot 310 between 307 and 303, thereby providing large lift gains; the 90° inverting flap also provides considerable lift gains as well as the necessary drag for landing. A take-off position of the mechanism is shown with my inverting flap in dash-cross lines. Because 307 has very little change in position it therefore has not been shown to avoid confusing the drawing; between 307 and 309 however there would be formed a second high lift low drag slot for take off of the type identified as 312. Further rotation of 309 to an approximately horizontal position shown in dash dot-dot-lines tends to change the T shape of the links towards the V shape thereby raising 307 to a shallower angle; this position has very low pitching moments, low aerodynamic flap loads, has only one slot in one region 310, and is useful for loiter operations.

The linkage system shown in FIG. 9 is driven by the eccentric connection 319 and is obviously applicable also to the type of structure shown in FIGURE 6, or for that matter in FIGURE 7 to define the gap between the auxiliary airfoil and the wing; for such applications arm 313 of my inverting flap would not be supported by the auxiliary flap itself as shown in FIGURE 9, but would be supported instead by a fixed flap bracket as is shown in FIGURES 6 and 7. In FIGURE 9 there is also shown a spoiler 302 which acts in a way similar to spoiler 53 of FIG. 3C.

FIGURES 10A and 10B show a double slotted leading edge flap of the type described in my patent application Ser. No. 337,879 entitled "Double Slotted Flap" dated Jan. 15, 1964; it is particularly advantageous for thin airfoils having very efficient trailing edge flaps.

Specifically FIGURE 10A shows in the high speed configuration the leading edge portion 2 of a thin airfoil which supports by means of bracket 4 hinged at pivot axis 6 a first leading edge flap 8 fixed to bracket 4 which defines the upper surface of the thin airfoil's contour.

Flap 8 supports at pivot axis 10 by means of bracket 12 a second leading edge flap 14 which defines the lower leading edge surface of wing 2; leading edge 14 has an articulated nose 16 which appears retracted in FIGURE 10A rotated about pivot axis 18. The entire flap combination permits maximum utilization of the volume inside the thin nose of the airfoil.

The same structure in the high lift position is shown in FIGURE 10B in which flap 8 and wing 2 define a first high lift slot 20, and flap 14 and flap 8 define a second high lift slot 22. Rounded portion 16 is positioned to increase the chord and camber of flap 14.

It is seen that flap 14 is upstream of flap 8 and inclined to wing 2 by a large angle which is illustrated to be of the order of 70° to wing 2; flap 8 is upstream of wing 2 and inclined to it by about 30°. These positions and orientations increase the camber and chord of wing 2 and provide flow reenergizing high lift slots. The components can be operated as explained in the specifications of above mentioned application 337,879.

Various modifications can be made without departing from the spirit of my invention.

What I claim is as follows:

1. A primary airfoil having an upper surface, a trailing edge portion, a trailing edge and a lower surface; an inverting airfoil mounted on said primary airfoil adjacent to said trailing edge, said inverting airfoil being adapted to be inverted by angular motion from a high-speed retracted position faired in said trailing edge portion of said airfoil to an extended position in which said inverting airfoil increases the effective area and chord of said primary airfoil; said primary and inverting airfoils being further characterized in that means are provided to move said inverting airfoil with respect to said primary airfoil comprising bracket means attached to said inverting airfoil with said bracket means having a root portion and a protruding portion, cable means attached to one of said bracket means and inverting flap at a location adjacent to said root portion and extending to said primary airfoil, with said cable means resting against said protruding portion when said flap is in said extended position, and with said cable means extending directly from said location adjacent to said root portion to said primary airfoil in a direction away from the protruding portion of said bracket when said inverting flap is retracted.

2. A primary airfoil having an upper surface, a trailing edge portion, a trailing edge and a lower surface; an inverting airfoil mounted on said primary airfoil adjacent to said trailing edge, said inverting airfoil being adapted to be inverted by angular motion from a high-speed retracted position faired in said trailing edge portion of said airfoil to an extended position in which said inverting airfoil increases the effective area and chord of said primary airfoil; said primary and inverting airfoils being further characterized in that the trailing edge portion of said primary airfoil has a movable auxiliary airfoil and a movable upper surface upstream of said auxiliary airfoil, and in that when said inverting airfoil is adapted to be positioned in a high-speed dive position protruding by a small amount below said lower surface, said movable portion is adapted to move upwardly away from said inverting airfoil forming a slot therebetween to relieve the pressures on top of said inverting airfoil by airflows from below said movable upper surface to on top of said auxiliary airfoil.

3. A primary airfoil having an upper surface, a trailing edge portion, a trailing edge and a lower surface; an inverting airfoil mounted on said primary airfoil adjacent to said trailing edge, said inverting airfoil being adapted to be inverted by angular motion from a high-speed retracted position faired in said trailing edge portion of said airfoil to an extended position in which said inverting airfoil increases the effective area and chord of said primary airfoil; said primary and inverting airfoils being further characterized in that an auxiliary airfoil is mounted adjacent to the trailing edge of said primary airfoil and adapted to be moved downwardly; and in that a movable portion is provided upstream of said auxiliary airfoil which is adapted to be moved downwardly when said auxiliary airfoil is displaced downwardly.

4. A primary airfoil having an upper surface, a trailing edge portion, a trailing edge and a lower surface; an inverting airfoil mounted on said primary airfoil adjacent to said trailing edge, said inverting airfoil being adapted to be inverted by angular motion from a high-speed retracted position faired in said trailing edge portion of said airfoil to an extended position in which said inverting airfoil increases the effective area and chord of said primary airfoil; said inverting airfoil being further characterized in having a rounded spanwise edge adjacent to which a slot is provided for high-lift chordwise flows from below said primary airfoil to on top of said inverting airfoil downstream of said slot when said inverting airfoil is in said extended position.

5. The structure of claim 4 is further characterized in that said primary airfoil has movable door means which, when said inverting airfoil is in said retracted position, covers the said slot of said inverting airfoil.

6. A primary airfoil having an upper surface, a trailing edge portion, a trailing edge and a lower surface; an inverting airfoil mounted on said primary airfoil adjacent to said trailing edge, said inverting airfoil being adapted to be inverted by angular motion from a high-speed retracted position faired in said trailing edge portion of said airfoil to an extended position in which said inverting airfoil increases the effective area and chord of said primary airfoil; said primary and inverting airfoils being further characterized in that said primary airfoil has a first auxiliary airfoil defining the trailing edge of said primary airfoil; in that a second auxiliary airfoil is mounted on said primary airfoil upstream of said first auxiliary airfoil; in that bracket means supports one of said first auxiliary airfoil and said second auxiliary airfoil by bracket connections located upstream of the airfoil said bracket means are supporting; and in that at least a portion of said airfoils are adapted to be moved to define two high-lift slots when said inverting airfoil is extended.

7. A primary airfoil having an upper surface, a trailing edge portion, a trailing edge and a lower surface; an inverting airfoil mounted on said primary airfoil adjacent to said trailing edge, said inverting airfoil being adapted to be inverted by angular motion from a high-speed retracted position faired in said trailing edge portion of said airfoil to an extended position in which said inverting airfoil increases the effective area and chord of said primary airfoil; said primary airfoil being further characterized in that an auxiliary airfoil is mounted adjacent to said trailing edge; in that in said extended position a first high-lift slot is defined between said primary and auxiliary airfoils, and a second high-lift slot is defined between said auxiliary and inverting airfoils; and in that programmed means are provided between said auxiliary and inverting airfoils to provide programmed motion of said auxiliary airfoil in response to the relative movement of said inverting airfoil.

8. The structure of claim 7, in which said programmed means comprise cam slot means on one of said inverting and auxiliary airfoils, and cam pin means on the other one of said inverting and auxiliary airfoils.

9. The structure of claim 7 is further characterized in that said programmed means comprise first, second, and third links connected to each other at one end, with the other end of said first link connected to said primary airfoil, with the other end of said second link connected to said auxiliary airfoil, and with the other end of said third link connected to said inverting airfoil.

10. A primary airfoil having an upper surface, a trailing edge portion, a trailing edge and a lower surface; an inverting airfoil mounted on said primary airfoil adjacent to said trailing edge, said inverting airfoil being adapted to be inverted by angular motion from a high-speed retracted position faired in said trailing edge portion of said airfoil to an extended position in which said inverting airfoil increases the effective area and chord of said primary airfoil; said inverting airfoil being further characterized in having a rounded spanwise edge of increased cross-sectional area, an opposite thin spanwise edge, and a first portion of reduced cross section adjacent to said thin edge; and said primary airfoil being additionally characterized in that in said trailing edge portion there is provided a spanwise structural element having surfaces extending between, and inclined at a substantial angle to, the upper and lower surfaces of said trailing edge portion; with said spanwise structural element being located downstream of said thin edge and above said first portion of said inverting airfoil when said inverting airfoil is in a retracted position within the contour of said primary airfoil, and with the depth of said spanwise structural element being of substantial magnitude by virtue of the reduced cross section of said first portion of said retracted inverting airfoil.

11. A high-lift modification for an aircraft wing having a rear spanwise structural element and a structural undersurface normally exposed to the airstream comprising, an inverting flap of increased chord size having a relatively thick rounded portion, and a relatively uniform thin portion; with said flap having, when retracted contiguous to said wing, its thin flap surface portion located upstream of said spanwise structural element overlapping a portion of said structural undersurface below and contiguous to said overlapped portion, and preventing direct contact of the said overlapped portion of the said wing undersurface with the airstream, with the downwardly facing side of said thin flap surface portion being exposed to the airstream, and with a streamlining protrusion positioned on said wing undersurface contiguous to and fairing aerodynamically the upstream edge of the said thin surface of the said inverting flap in the retracted position.

12. A primary airfoil having an upper surface, a trailing edge portion, a trailing edge and a lower surface; an inverting airfoil mounted on said primary airfoil adjacent to said trailing edge, said inverting airfoil being adapted to be inverted by angular motion from a high-speed retracted position faired in said trailing edge portion of said airfoil to an extended position in which said inverting airfoil increases the effective area and chord of said primary airfoil; said primary airfoil being further characterized by having a rearwardly extending bracket; in that said inverting airfoil is supported on said bracket by a pivotal connection; in that an auxiliary airfoil defines said trailing edge and is pivoted to said bracket at a second hinge axis on said bracket; and in that a link member connects said inverting airfoil with said auxiliary airfoil to provide programmed motion to said auxiliary airfoil with respect to said primary airfoil in response to the movement of said inverting airfoil to said extended position.

13. A primary airfoil having an upper surface, a trailing edge portion, a trailing edge and a lower surface; an inverting airfoil mounted on said primary airfoil adjacent to said trailing edge, said inverting airfoil being adapted to be inverted by angular motion from a high-speed retracted position faired in said trailing edge portion of said airfoil to an extended position in which said inverting airfoil increases the effective area and chord of said primary airfoil; said primary and inverting airfoils being further characterized in that during retraction of said inverting airfoil from a trailing position, upstream downwardly, and thence upstream upwardly toward said retracted position, there is a temporary drag rise and associated increment of required retraction energy; in that there is a change of wing and flap forces having a maximum between said trailing and retracted position; and in that means are provided to reduce inverting airfoil forces and energy of retraction and to increase smoothness of retraction process comprising a division of said inverting airfoil into an inboard portion and an outboard portion, which portions are adapted to retract from said trailing position one after the other.

14. The structure of claim 13 is further characterized in that the same energy source is used to retract said inboard and outboard inverting airfoil portions.

15. The structure of claim 13 is further characterized in that adjacent ends of said portions of said inverting airfoil are supported by first ear means to a single primary airfoil bracket; and in that an auxiliary airfoil is provided mounted on a said primary airfoil bracket by means of second ear means which extend from said auxiliary airfoil and are located adjacent to a portion of said primary airfoil bracket.

16. A primary airfoil having an upper surface, a trailing edge portion, a trailing edge and a lower surface; an inverting airfoil mounted on said primary airfoil adjacent to said trailing edge, said inverting airfoil being adapted to be inverted by angular motion from a high-speed retracted position faired in said trailing edge portion of said airfoil to an extended position in which said inverting airfoil increases the effective area and chord of said primary airfoil; said inverting airfoil being further characterized by being supported by first ear means to a first hinge axis on rearwardly extending primary airfoil bracket means; and in that an auxiliary airfoil is mounted on said primary airfoil bracket means at a second hinge axis by means of second ear means which extends from a spanwise end of said auxiliary airfoil located contiguous to said first ear means, said second and first ear means being mounted in separate but adjacent planes at laterally displaced connections on said primary airfoil bracket.

17. A primary airfoil having an upper surface, a trailing edge portion, a trailing edge and a lower surface; an inverting airfoil mounted on said primary airfoil adjacent to said trailing edge, said inverting airfoil being adapted to be inverted by angular motion from a high-speed retracted position faired in said trailing edge portion of said airfoil to an extended position in which said inverting airfoil increases the effective area and chord of said primary airfoil in a trailing disposition; said primary and inverting airfoils being further characterized in that the structure to provide high lift together with high drag and low pitching moments on said primary airfoil by aerodynamic influence of said inverting airfoil comprises landing disposition of said inverting airfoil approximately perpendicular to said primary airfoil, in which the resultant inverting airfoil force vector has a line of action approximately parallel to the chord of said primary airfoil, with the moment arm distance of said resultant force vector to the aerodynamic center of moments on said primary airfoil, being of the order of the chord of said inverting airfoil.

18. An aircraft capable of steep approach paths having a pair of wings; propulsive propellers mounted on said wings, inverting flaps mounted on said wings and adapted to be deflected at about 90° to said wings intercepting the slipstream of said propellers to produce a large drag force in the landing maneuver; and slot means provided between said wing and said deflected inverting flap.

19. An aircraft having a central fuselage; a pair of wings one on each side of said fuselage; an inverting flap one on each of said wings connected at a spanwise hinge axis to said wings; cable means connecting each of said flaps to said wings and located, when said inverting flaps are in a trailing position, below said hinge axes; a flap retraction unit on said aircraft having means to withdraw and pay out said cables, means routing said cables from said flaps to said unit, means for extending said flaps separate from said cables; said aircraft being further characterized in that the aerodynamic loads, which during flap motion tend to extend said inverting flap, are resisted by said cable means, with said flaps being moved in angular synchronization by equal payout of withdrawal of their corresponding cables from said means of said retraction unit.

20. An aircraft having a central fuselage, a primary airfoil mounted on said central fuselage extending on both sides of said fuselage, said primary airfoil having on each side of said fuselage an upper surface, a trailing portion, a trailing edge and a lower surface; an inverting airfoil mounted on said primary airfoil on each side of said fuselage adjacent to said trailing edge, said inverting airfoil being adapted to be inverted by angular motion from a high-speed retracted position faired in said trailing edge portion of said airfoil, to an extended trailing position in which said inverting airfoil increases the effective area and chord of said primary airfoil; said primary and inverting airfoils being characterized in that during retraction of said inverting airfoil from said trailing position, upstream downwardly, and thence upstream upwardly toward said retracted position, there is a temporary inverting airfoil load increase and associated increment of required retraction energy, and in that there is a change of primary and inverting airfoil forces having a maximum magnitude between said trailing and retracted positions; said primary and inverting airfoils being further characterized in that the structure and method to reduce forces and moments induced by said inverting airfoil on said aircraft during retraction from said extended trailing position to said retracted position, and to minimize the energy used during retraction cycle, comprise structurally divided inverting airfoils on each side of said central fuselage, said structurally divided inverting airfoils on each side of said central fuselage having an outboard portion separate from an inboard portion, said portions defining thereby an outboard structural inverting airfoil pair and an inboard structural inverting airfoil pair which are retracted substantially at different times, one of said airfoil pairs after the other airfoil pair, whereby smooth retraction process of reduced loads and minimum energy is accomplished.

21. A primary airfoil having a trailing edge portion; an inverting airfoil having a rounded spanwise edge portion adjacent said trailing edge portion and a thin spanwise edge portion away from said trailing edge portion;
said inverting airfoil being mounted on said primary airfoil by a generally chordwise narrow bracket fixed to said inverting airfoil and extending from said rounded portion to engage a pivot axis fixed to said primary airfoil upstream of its trailing edge when said inverting airfoil is retracted;
said inverting airfoil being adapted to be moved from a retracted high-speed position nested in the undersurface portion of said trailing edge portion upstream of said pivot axis, and an extended position downstream of said trailing edge portion;
said inverting airfoil having slot means adjacent said rounded edge to produce high-lift flows when said inverting airfoil is in said extended position.

22. The structure of claim 21 further characterized in that said slot means have, when said inverting airfoil is in said extended position, an intake mouth which, when said inverting airfoil is in said retracted position, is covered by a portion of said trailing edge portion of said primary airfoil.

23. The structure of claim 21 further characterized in that when said inverting airfoil is in said extended position, the rounded edge of said auxiliary airfoil is below elevation of, and spaced from, said trailing edge portion of said primary airfoil to define walls of an upstream slot therebetween, with the said slot means being located downstream of the said upstream slot thereby defining a double slotted high lift inverting airfoil system.

24. The structure of claim 21 further characterized in that said trailing edge portion includes a movable surface which is adapted to be inclined with respect to said primary airfoil when said inverting airfoil is in said extended position.

25. The structure of claim 24 further characterized in that the upstream portion of said movable surface is spaced from and below the adjacent portion of said primary airfoil to define therebetween a first slot for airflow from below said primary airfoil to on top of its movable surface; in that said inverting airfoil in said extended position has its rounded portion spaced from and below the downstream portion of said movable surface to define therebetween a second slot for airflow from below said primary airfoil to on top of said inverting airfoil; and in that said slot means of said inverting airfoil are located downstream of said second slot, thereby defining a triple slotted high lift inverting airfoil system.

References Cited

UNITED STATES PATENTS

| | | | |
|---|---|---|---|
| 1,893,065 | 1/1933 | Zaparka | 244—42 |
| 2,070,705 | 2/1937 | Barnhart | 244—42 |
| 2,156,403 | 5/1939 | Riviere | 244—42 |
| 2,377,386 | 6/1945 | Stalker | 244—42 |
| 3,041,014 | 6/1962 | Gerin | 244—42 |
| 3,085,740 | 4/1963 | Wagner | 244—42 |
| 3,126,173 | 3/1964 | Calderon | 244—42 |

FOREIGN PATENTS 971,229    1/1951    France.

MILTON BUCHLER, *Primary Examiner.*

FERGUS S. MIDDLETON, *Examiner.*

B. BELKIN, *Assistant Examiner.*